Figure 1:
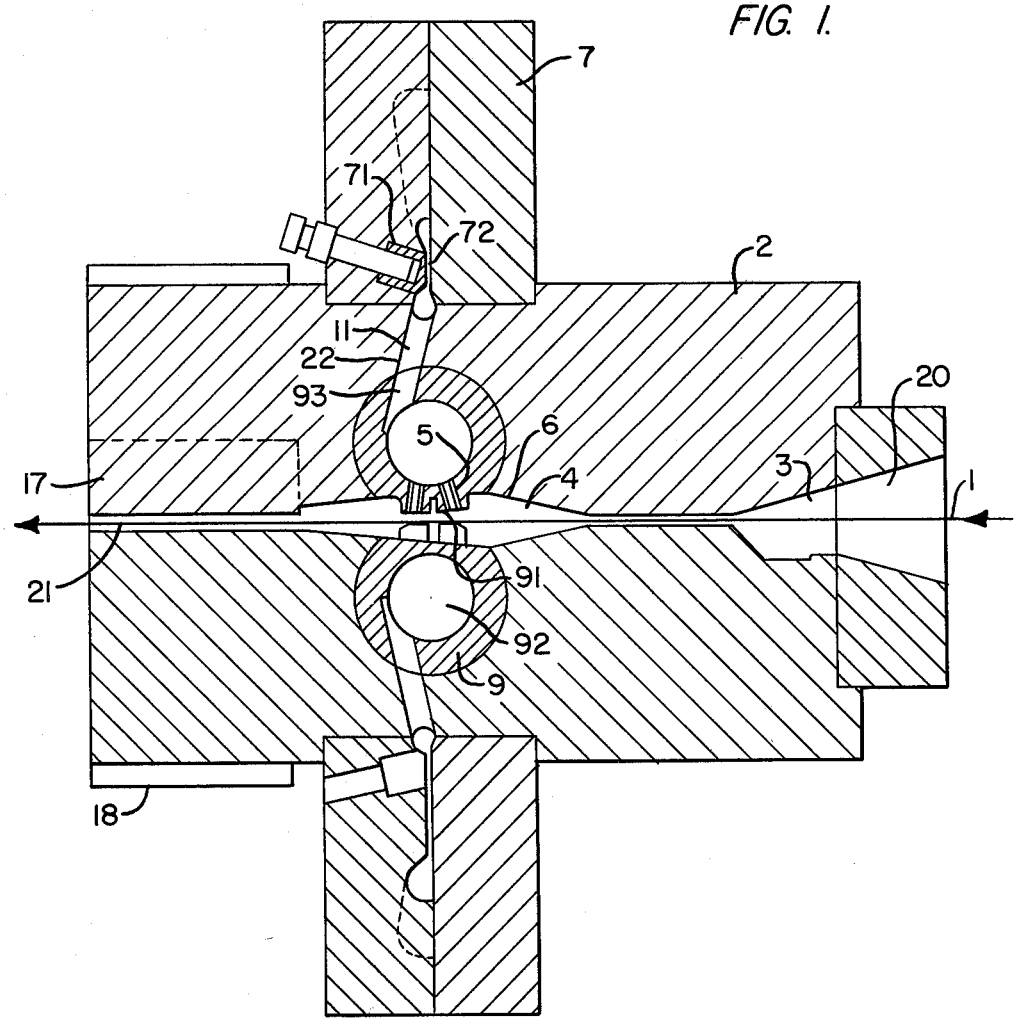

United States Patent [19]

Wissinger et al.

[11] 4,128,386

[45] Dec. 5, 1978

[54] APPARATUS FOR THE EXTRUSION OF PATTERNED SHEETS OR PANELS OF THERMOPLASTIC SYNTHETIC RESIN COMPOSITIONS

[75] Inventors: Waldemar Wissinger, Siegburg; Kurt Webermeier, Bonn, both of Germany

[73] Assignee: Dynamit Nobel Aktiengesellschaft, Germany

[21] Appl. No.: 711,564

[22] Filed: Aug. 4, 1976

[30] Foreign Application Priority Data

Aug. 4, 1975 [DE] Fed. Rep. of Germany ....... 2534724

[51] Int. Cl.² .............................................. B29F 3/12
[52] U.S. Cl. ...................................... 425/462; 264/171; 264/245; 425/131.1; 425/132; 425/376 A
[58] Field of Search ........................... 264/75, 171, 245; 425/131.1, 132, 133.5, 462, 376 R, 376 A, 376 B

[56] References Cited

U.S. PATENT DOCUMENTS

| 2,803,041 | 8/1957 | Hill et al. ......................... 425/132 X |
| 3,274,646 | 9/1966 | Krystof ............................. 425/131.1 |
| 3,444,031 | 5/1969 | Schrenk ......................... 425/131.1 X |
| 3,792,945 | 2/1974 | Randall ............................. 425/132 |

FOREIGN PATENT DOCUMENTS 2122604  11/1971  Fed. Rep. of Germany ........... 425/132

Primary Examiner—Francis S. Husar
Assistant Examiner—Mark Rosenbaum
Attorney, Agent, or Firm—Craig & Antonelli

[57] ABSTRACT

A process for extruding patterned sheets or panels of differently colored thermoplastic synthetic resin compositions which include the steps of distributing additional color compositions outside of an extrusion duct of a basic color composition over a number of individual feed channels and introducing the additional color compositions at right angles to the direction of flow of the basic color composition into the interior of the stream of the basic color composition at locations over the width and thickness in an initial flow zone via said channels.

15 Claims, 5 Drawing Figures

APPARATUS FOR THE EXTRUSION OF PATTERNED SHEETS OR PANELS OF THERMOPLASTIC SYNTHETIC RESIN COMPOSITIONS

The present invention relates to a process for the extrusion of patterned sheets or panels of differently colored thermoplastic synthetic resin compositions, wherein the compositions with the additional colors for patterning purposes are introduced into the composition consisting of the basic color within the long-slot extrusion die in the region of the initial flow zone. The apparatus for conducting the process is equipped with a broad extruder head for the extrusion of the patterned sheets or panels, fed with the basic color, and with one or more supplemental extruder dies for the additional colored compositions introduced into the basic color composition within the broad extruder head in the initial flow zone of the long-slot extrusion die.

DAS (German Published Application) No. 1,554,863 describes, for example, an extruder used for the manufacture of layered sheets of thermoplastic synthetic resins wherein there is embedded, in one layer, a second layer of a differently colored synthetic resin. In this process, the basic color composition stream, also called main stream, is extruded through a chamber via an adapter, and the secondary stream having another color has its discharge part within the chamber of the primary stream conduit. The discharge part is fashioned as a sliding nozzle displaceable to and fro transversely to the direction of the main stream conduit, wherein the colored compositions exit from the secondary stream conduit in the flow direction. This sliding nozzle is fed from one side; as a consequence, the pressure drops over the length of the sliding nozzle, thus making it impossible to attain a uniform distribution of the additional colors over the entire width of the sheet to be extruded. For this reason, the width to be extruded is also limited to a relatively short length of the sliding nozzle still ensuring a uniform feed of the additional color over the width of the panel or sheet. A further disadvantage of the conventional extruder results from the laminar flow phenomena and the feeding of the additional colors in the flow direction, since thereby the thus-introduced additional colors remain arranged in uniform planes over the entire width and thickness of the panels. This means that, as seen over the cross-section, especially over the thickness of the panel, an only minor extent of patterning can be achieved. Due to feeding the color at right angles to the width of the sheet from a narrow side of the die within the primary mass stream, it is furthermore impossible to effect a direct control at the individual exit points of the secondary stream into the primary stream.

The present invention is based on the problem of extruding synthetic resin sheets of a multicolored pattern, wherein the various colors extend in layers, for example in Havanna structures, wherein also in case of large sheet widths extruded there is attainable a uniform distribution of the individual, colored compositions over the entire sheet width and is controllable with precision, i.e. the different color composition streams can be controlled until they flow together. At the same time, it is possible to attain a greater capacity of varying the pattern design with corresponding reproducibility thereof.

The process of this invention solves the thus-posed problem by providing that the additional color compositions are distributed outside of the extrusion duct of the basic color composition over an arbitrary number of individual feed channels, and the additional color compositions are introduced into the interior of the basic color composition stream preferably approximately at right angles to the flow direction of the basic color composition at any desired points over the width and thickness in the initial flow zone by way of the individual feed channels. Preferably, the additional color composition stream is introduced in fine distribution at many individual points into the basic color composition stream. The introduction of the additional color compositions from the outside at arbitrary points over the plate width and/or the extruded sheet width makes it possible to effect a corresponding control of the color composition distribution from the outside, since the distribution of the color composition into individual streams takes place already outside of the primary extrusion duct, whereby variations in the pattern over the width of the extruded sheet are avoided. It is thus also possible to regulate the distribution of the color composition during production, so that pattern design errors during the production are compensated for. However, this also makes it possible to extrude very large sheet widths, which can be done by means of very wide long-slot dies. Due to the introduction of the additional colors, provided according to this invention vertically to the flow direction of the basic color composition, it is likewise possible to feed such additional colors at various points over the thickness of the plate and/or to introduce same in alternating layers. By means of the process of this invention, an extensively predeterminable introduction of the color compositions into the basic composition can be attained, and even in case of large sheet widths, a precise control of the various composition streams can be achieved.

An apparatus for conducting the process is characterized according to this invention by arranging, in the walls of the long-slot die defining the width of the initial flow zone, feed channels for the additional color compositions, preferably approximately at right angles to the walls. The provision is made to have the feed channels extend into the initial flow zone, preferably to varying extents. In this way, it is possible to introduce the color composition streams at many individual points, independently of one another and at differing locations over the thickness of the sheet to be extruded. The feed channels can extend into the initial flow zone from the upper and lower die halves of the long-slot die. The depth of immersion of the feed channels into the initial flow zone, i.e. into the basic color composition stream, determines the location of the introduced color composition within the extruded thickness of the sheet, whereas the mutual spacing of the feed channels in the transverse or longitudinal direction makes it possible to achieve additional pattern variations.

A further variation of the pattern design is possible by an interval-type interruption of the feed of the additional color compositions.

To ensure a maximally uniform feeding of the additional color compositions, a further development of the invention provides that the feed channels of one half of the extruder tool are fed by a further long-slot die. In this way, the assurance is obtained that each feed channel is fed, over the entire width of the sheet to be extruded, with the color composition stream under the same conditions, and thus a uniform patterning of the extruded sheet is achieved over the entire width.

It is advantageous to arrange the feed channels on a support which can be inserted in the wall of the long-slot die and can be exchanged. The arrangement and structure of the feed channels essentially determines the pattern formation; due to the exchangeability of the support of the feed channels, it is possible to extrude diverse patterns with the same extrusion tool and another support.

The support of the feed channels can advantageously be fashioned as a cylindrical sleeve, wherein the feed channels are designed as radial bores in the wall of the bushing. The color composition stream can then pass via inlet bores into the bushing and its central bore, from where the color composition stream can enter into the initial flow zone into the basic color composition stream by way of the individual feed channels.

One embodiment of the sleeve with the feed channels provides that the feed channels terminate in projections of the sleeve wherein the projections affect the flow characteristics in the initial flow zone by their cross-sectional configuraion, e.g. round, rectangular, or sword-shaped, thus affecting the design of the pattern. Furthermore, the length of the projections, i.e. their depth of immersion into the basic color composition stream, can be varied whereby the location of feeding the additional color composition stream is determined.

For the interval-type interruption of the feed of the color composition stream from the feed channels, a further development of the invention provides that slides or slide means movable in a rotary or axial direction are arranged between the extrusion dies and the outlet from the preliminary ducts. Advantageously, a rotary slide is utilized with helically extending external grooves and a central axial bore, wherein the external grooves are in communication with the central bore via a plurality of individual bores. A rotary slide constructed in this way has the advantage that the conveying effect of the outer screw in the axial direction is practically eliminated, since an oppositely oriented backflow is produced in the central bore. However, this ensures a uniform feed of the color composition stream to the individual feed channels over the entire width.

An advantageous embodiment of the invention provides that the slide is arranged within the support of the feed channels.

A further embodiment of the apparatus of this invention includes the feature that the rear edges of the feed channels, as seen in the flow direction, are undercut so that the color composition stream fed thereto is not urged away by a laminar flow. In addition, it is advantageous to fashion the entire cross-section of the projections so that it is favorable from the viewpoint of flow dynamics.

Figure 2:
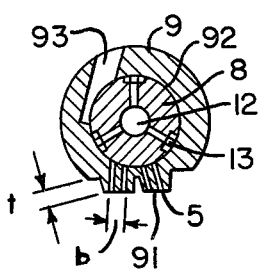
Figure 5:
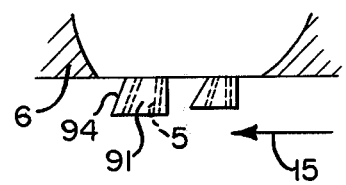
Figure 3:
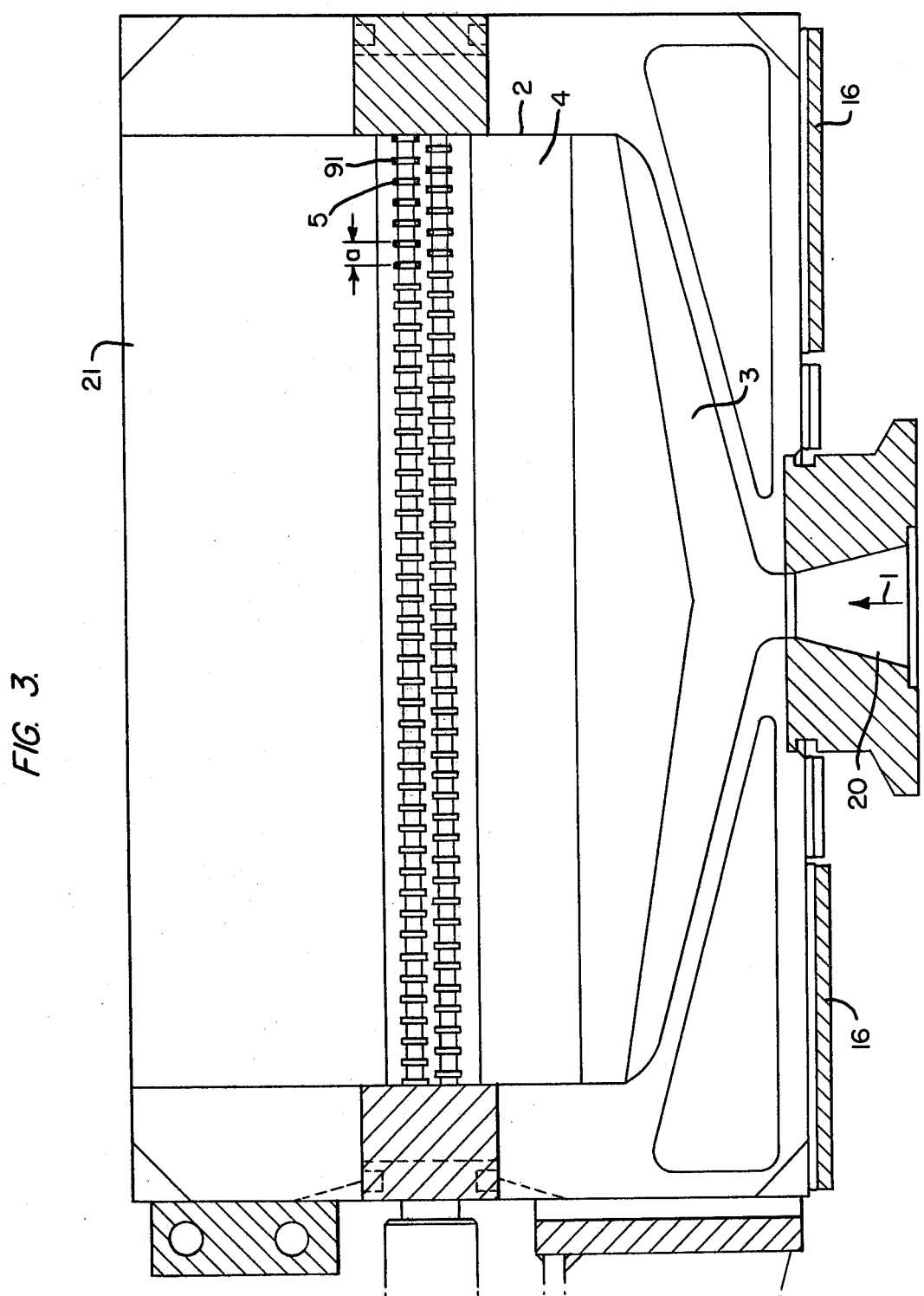
Figure 4:
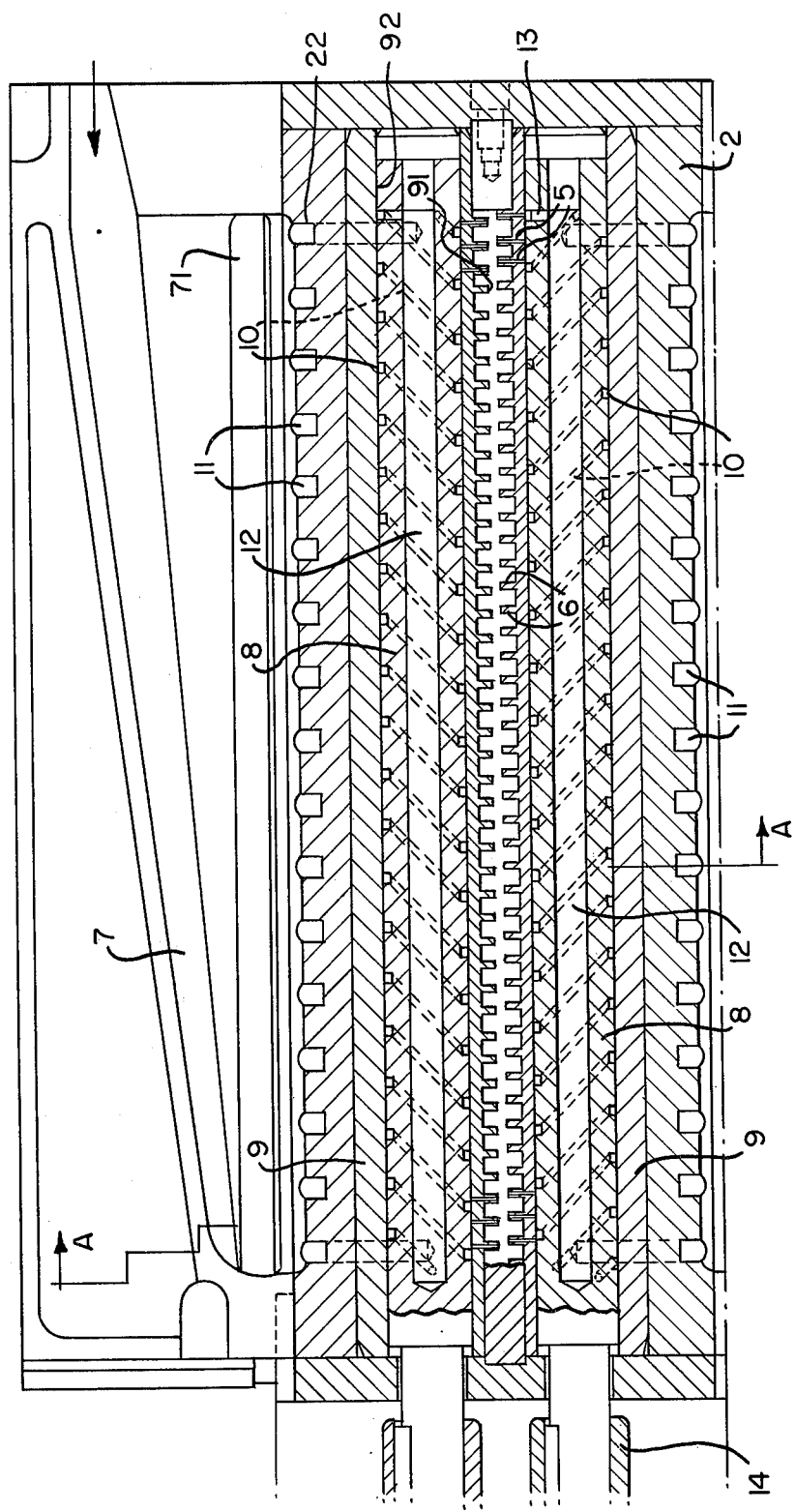

The invention will be explained in greater detail with reference to an embodiment illustrated in the drawings, wherein:

FIG. 1 shows a vertical, simplified longitudinal section through a long-slot extrusion die for multicolored extruded sheets of thermoplastic synthetic resins in accordance with section line A—A of FIG. 4, FIG. 2 shows a detail completed in accordance with FIG. 1, FIG. 3 shows a top view of the lower die half of the long-slot extrusion die of FIG. 1, and FIG. 4 shows a vertical cross-section through the die according to FIG. 1 with the detail according to FIG. 2, FIG. 5 shows a plan view of a detail on an enlarged scale taken from FIG. 1.

The apparatus of the claimed can be utilized, for example, for the extrusion of multicolored thermoplastic synthetic resin sheets of cellulose acetate or cellulose acetobutyrate for the manufacture of the fundamental material for plastic articles, e.g., glass frames or the like. In particular, the process of this invention and the associated apparatus are suitable for the manufacture of patterned sheets wherein additional thermoplastic color compositions consisting of one or more colors are incorporated into a transparent basic thermoplastic color composition, these additional color compositions being distributed in the basic color composition in variable, but reproducible patterns. It will be understood that various thermoplastic resinous materials are suitable for purposes of this invention. In general, these materials are colored with colorants that are immiscible with each other and are introduced in the melt or molten state. Exemplary of suitable colorants are all organic or inorganic pigments or dye stuff, compatible with the thermoplastic material. Also, other suitable resinous materials include polymethylmethacrylate or copolymers, polystyrene, and cellulose propionate.

The basic color composition stream 1 required to produce the patterned, thermoplastic sheet is extruded by way of the broad extruder head 2 with the long-slot die 3. The inlet duct 20 is followed by the long-slot die distributor zone 3 followed by the initial flow zone 4, which passes over into the die outlet slot 21. The long-slot extruder head 2 consists of an upper and lower die half or part. In order to be able to introduce the additional color compositions into this basic color composition stream 1 at the desired, arbitrary locations, the tubular feed channels 5 are arranged in the initial flow zone 4 of the broad extruder head 2 approximately at right angles to the walls 6 of the initial flow zone 4, wherein these feed channels 5 are provided at the upper die half as well as at the lower die half, and thus extend on both sides from the walls 6 into the initial flow zone 4. The depth $t$ of immersion, see FIG. 2, of the feed channels 5 into the initial flow zone 4 determines the position of each color composition within the extruded sheet thickness, whereas the spacing of the feed channels 5 in the transverse direction $a$ and longitudinal direction $b$, respectively, affords additional pattern variations.

These feed channels 5 are fed with the additional color compositions by way of long-slot dies 7, wherein respectively one additional long-slot die 7 is arranged at the upper tool half as well as the lower tool half of the long-slot extruder head 2. By way of these long-slot dies 7, it is possible to feed identically or differently colored, additional color compositions into the stream of basic color composition 1. The long-slot dies 7 can be equipped in the initial flow zone 72 also with deckles 71 for controlling the color composition flow.

The tubular feed channels 5 for the introduction of the additional color compositions can be constructed in accordance with the desired patterns, wherein the length, i.e. the depth of immersion of the feed channels into the initial flow zone 4 depends on the location where the additional color is to be disposed in the cross-section of the sheet to be extruded. In this connection, it is likewise possible to allow the color composition fed from one side, i.e., one die half to exit also in the other, opposite half of the die. The tubular feed channels 5 are preferably fashioned within projections 91, wherein these projections can be of any desired cross-section. These projections can exhibit, for example, a round, rectangular, or sword-like cross-section and can include one or more feed channels 5, depending on the requirements. It is advantageous to fashion these projections 91, as seen in the flow direction 15 at the rear edge 94, to be undercut so that the stream of color composition exiting from the feed channels 5 is torn off at the edge and is not urged, for example, against the wall 6. In the illustrated embodiment, the projections 91 are each equipped with two feed channels 5, but this is exclusively dependent on the desired patterns to be produced. The arrangement and configuration of the feed channels 5 and of the projections 91 determine the pattern formation and the flow conditions, and thus provision is made to locate these feed channels on exchangeable supports 9, for example cylindrical sleeves. These cylindrical sleeves are inserted in the die halves 2 of the long-slot extruder head so that the projections 91 extend into the initial flow zone 4. The color composition stream 11 is fed from the long-slot dies 7 via the initial flow zone 72 through bores 22 in the die 2 into inlet bores 93 of the sleeve 9. From the inlet bores 93, the color composition stream enters the central bore 92 from where it passes on to the individual feed channels 5. By means of the combined extrusion tool as provided by this invention, it is possible to subdivide the individual composition streams into basic colors and additional colors and to effect the feeding of the additional colors from the outside vertically into the initial flow zone of the basic color composition stream, wherein each composition stream can be controlled and regulated separately in a mechanical and/or thermal fashion. This makes it possible to effect a uniform feed of the color compositions over the entire width for the basic and additional colors. Furthermore, this provides a uniform thickness and, above all, also a uniform pattern over the entire width of the extruded sheet.

To interrupt the color composition streams for an additional variation of the pattern, devices 8 are arranged between the long-slot dies 7 and the feed channels 5; these devices interrupt the stream of color compositions at intervals. These devices 8 are, for example, rotating or axially movable slides. In the illustrated example, a rotary slide 8 is provided which is mounted in the central bore 92 of the sleeve 9 which is fashioned as a support of the feed channels 5. The rotary slide 8 is fashioned with helically extending outer grooves 10 in a single-thread or multiple-thread design, which can exhibit a more or less great pitch. The rotary speed of the rotary slide is dependent on the desired pattern formation. In the schematic drawing, triple-thread rotary slides 8 are illustrated. Since such helically fashioned rotary slides afford, during their rotation, also a conveying action in the axial direction, i.e. at right angles to the width of the sheet and thus ensue in a nonuniform color distribution of the stream 11 of material, uniformly delivered through the long-slot dies 7, a special construction of the rotary slide is utilized to counteract and prevent this from happening. For this purpose, the rotary slides 8 are equipped with the central middle bore 12. This central bore 12 is connected with the helically extending outer grooves 10 by means of a plurality of individual bores 13. This practically eliminates the conveying effect of the screw in the axial direction, since an oppositely oriented backflow is produced in the central bore 12. However, this makes it possible to provide a uniform feed of color composition for all feed channels 5, even in case of an interval-type interruption of the color composition stream by the rotary slide.

Since the stream exiting from the die exit slot 21 is composed of several individual color composition streams, the combination of the individual color composition streams can, in turn, result in a nonuniform total thickness. For this reason, the exit nozzle 21 of the long-slot extruder head 2 is equipped with the adjustable die land 17 for the mechanical adjustment and with a thermal control 18.

The arrangement of the rotary slide 8 within the sleeve 9 with the feed channels 5 is illustrated in FIG. 2, whereas FIG. 1 shows the sleeve 9 without a rotary slide 8. From the plan view of FIG. 3, one can see furthermore the arrangement of the individual feed channels 5 with the projections 91 of the sleeve 9 in one tool half of the long-slot extruder head 2, and furthermore derivable from this figure are the construction of the long-slot die and the arrangement of the feed channels 5 within the initial flow zone 4. Numeral 16 here denotes additional heating elements on the outside of the long-slot extruder head 2 serving for the thermal control of the die.

FIG. 4 shows in detail the feeding of the additional color composition streams by way of additional long-slot dies 7 into the basic color composition steam of the long-slot extruder head 2 in the region of the initial flow zone 4. In this arrangement, one can also see, for example, the offset disposition of the feed channels 5 in the upper and lower die halves, whereby a fine, uniform distribution of the additionally fed color compositions into the basic color stream is attained. The depths of immersion of the projections 91 and thus the exiting of the color composition from the feed channels 5 into the basic color composition stream can vary.

As compared to the conventional processes and devices, it is possible by means of the present invention to attain a predeterminable, uniform introduction of color over great widths of a long-shot die with a precise control of the various composition streams. It is not only possible to attain numerous variegated patterns, but also to produce such patterns in a reproducible manner in uniform quality.

We claim:

1. An apparatus for the extrusion of patterned sheets or panels of a basic color thermoplastic resin composition having at least one additional colored thermoplastic resin composition therein, comprising:

(a) a long-slot extruder head for extruding the patterned sheets or panels, said extruder head having inlet means for introducing said basic color thermoplastic resin composition to the extruder head, said extruder head having an initial flow zone therein, said initial flow zone being downstream, in the direction of flow of the basic color thermoplastic resin composition through the extruder head, from said inlet means for introducing said basic color composition to the extruder head, (b) means for adding at least one additional color thermoplastic resin composition to said basic color composition, said means being positioned to feed directly into said initial flow zone and comprising at least one feed channel, said at least one feed channel being constructed on a support that is insertable in the walls of the long-slot extruder head and is exchangeable, and (c) a long-slot extrusion die in flow communication with said at least one feed channel for feeding said at least one additional colored thermoplastic resin composition to said at least one feed channel.

2. An apparatus according to claim 1, wherein the at least one feed channel extends into the initial flow zone.

3. An apparatus according to claim 2, wherein the at least one feed channel extends into the initial flow zone at varying depths.

4. An apparatus according to claim 1, having a plurality of feed channels and wherein the feed channels extend into the initial flow zone from upper and lower die halves of the long-slot extruder head.

5. An apparatus according to claim 1, wherein the at least one feed channel is fashioned as radial bores in the wall of a cylindrical sleeve serving as the support.

6. An apparatus according to claim 5, wherein the at least one feed channel terminates in projections of the sleeve affecting the flow conditions in the initial flow zone by its cross-sectional configuration.

7. An apparatus according to claim 6, wherein at least one rotatably movable slide is arranged between said long-slot extrusion die and said at least one feed channel to interrupt the color composition stream exiting from said at least one feed channel.

8. An apparatus according to claim 7, wherein the at least one rotatably movable slide is provided with helically extending outer grooves and with a central, axial middle bore such that the outer grooves are in communication with the middle bore via a plurality of individual bores.

9. An apparatus according to claim 8, wherein the at least one rotating slide is disposed within the support of said at least one feed channel.

10. An apparatus according to claim 9, wherein the rear edges, as seen in the flow direction, of said at least one feed channel are under cut.

11. An apparatus according to claim 6, wherein at least one axially movable slide is arranged between said long-slot extrusion die and said at least one feed channel to interrupt the color composition stream exiting from said at least one feed channel.

12. An apparatus according to claim 1, wherein said at least one feed channel is arranged in the wall of said long-slot extruder head defining the width of the initial flow zone and extends approximately at right angles to the wall.

13. An apparatus according to claim 1, wherein said long-slot extrusion die feeds said at least one additional colored thermoplastic resin composition to all of the feed channels, whereby each feed channel is fed with the color composition stream under the same conditions.

14. An apparatus for the extrusion of patterned sheets or panels of a basic color thermoplastic resin composition having at least one additional colored thermoplastic resin composition therein, comprising:

(a) extruder head means for extruding the patterned sheets or panels, said extruder head means having inlet means for introducing said basic color thermoplastic resin composition to the extruder head, said extruder head means having an initial flow zone therein, said initial flow zone being downstream, in the direction of flow of the basic color thermoplastic resin composition through the extruder head means, from the inlet means for introducing said basic color composition to said head means, (b) means for adding at least one additional color thermoplastic resin composition to said basic color composition, said means being positioned to feed directly into said initial flow zone and comprising a plurality of feed channels, said plurality of feed channels being constructed on a support that is insertable in the walls of the long-slot extruder head and is exchangeable, and (c) extrusion die means, in flow communication with said plurality of feed channels, for uniformly feeding said at least one additional colored thermoplastic resin composition to all of said plurality of feed channels.

15. The apparatus according to claim 14, wherein the plurality of feed channels is arranged in a wall of said extruder head means defining the width of the initial flow zone and extends approximately at right angles to the wall.

* * * * *